United States Patent [19]
Consolatti et al.

[11] Patent Number: 5,909,214
[45] Date of Patent: *Jun. 1, 1999

[54] METHOD AND SYSTEM FOR DROP GUIDES FOR VISUAL LAYOUT IN JAVA LAYOUT MANAGERS

[75] Inventors: Scott Michael Consolatti; Carol Ann Jones, both of Raleigh; Christopher J. Paul, Durham, all of N.C.

[73] Assignee: International Business Machines Corp., Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/742,173

[22] Filed: Nov. 4, 1996

[51] Int. Cl.$^6$ .................................................. G06F 3/00
[52] U.S. Cl. ......................... 345/339; 345/334; 345/967
[58] Field of Search ................................. 345/326, 333, 345/334, 335, 339, 340, 342, 351

[56] References Cited

U.S. PATENT DOCUMENTS

| | | | |
|---|---|---|---|
| 5,555,369 | 9/1996 | Menendez et al. | 345/334 |
| 5,555,370 | 9/1996 | Li et al. | 345/334 |
| 5,559,947 | 9/1996 | Wugofski | 345/334 |
| 5,584,035 | 12/1996 | Duggan et al. | 345/339 |
| 5,588,105 | 12/1996 | Foster et al. | 345/326 |
| 5,664,129 | 9/1997 | Futatsugi et al. | 345/339 |

OTHER PUBLICATIONS

News Release, "Parcplace–Digitalk announces Availability of Parts for Java: First Visual Development Tool for Java Applet Solutions", pp. 2–3, May 1996.

News Release, "A Guide To Java Tools—Be forewarned: These six integrated packages for Windows and Mac are first–generation", pp. 4–11, Jeff Jurvis, Sep. 1996.

News Release, "Jamba Puts Applet Development within easy reach; Windows–Based Visual Authoring Tools Is Powerful But Is Best For Beginners", pp. 11–12, Serg Koren, Aug. 1996.

News Release, "Your own Java layout manager", pp. 1–2, C. Bear, Oct. 1996.

News Release, pp. 12–19, Rivka Tadjer and David A. Harvey, Oct. 1996.

News Release, "ParcPlace Intensifies Java Efforts Through New Independent Division", Business Wire, Oct. 1996.

News Release, "ParcPlace–Digitalk Sets Up Unit To Direct Java Efforts", Computer Reseller News, Oct. 1996.

News Release, "Java parts due from ObjectShare", PC Week, Oct. 1996.

News Release, "PARTS FOR JAVA 2.0; Visual Programming For Java", Oct. 1996.

*Primary Examiner*—Raymond J. Bayerl
*Assistant Examiner*—X. L. Bautista
*Attorney, Agent, or Firm*—A. Bruce Clay

[57] ABSTRACT

Drop guides are added to a Java layout manager to receive parts for a layout. When a drop guide is empty and able to receive a part, passing a cursor over the drop guide will cause it to be highlighted. Drop guides may be added in positions before, after, over and below any part for greater flexibility in laying out parts.

15 Claims, 7 Drawing Sheets

METHOD AND SYSTEM FOR DROP GUIDES FOR VISUAL LAYOUT IN JAVA LAYOUT MANAGERS

FIELD OF THE INVENTION

This invention relates in general to computer software and, in particular, to a method and system for providing drop guides to aid in the visual layout of parts in a Java layout manager.

BACKGROUND OF THE INVENTION

Application development tools are frequently provided to program developers to make the job of programming simpler and more efficient. A technique that has been developed to assist novice and intermediate programmers using such tools, such as VisualAge for Smalltalk from International Business Machines Corporation ("IBM") and PowerBuilder from Sybase Inc., has been the concept of visual programming from parts. ("VisualAge" is a registered trademark of IBM.) In addition to the underlying programming language, such tools provide a selection of pre-built software parts or components presented to a software developer via an icon in a graphical user interface together with an open work space. By simply selecting one of the icons and dragging it into the work space, the developer in effect programs an application that the developer is creating to include the code for the function of the part or component which the icon represents.

Programming from parts is especially effective for developing graphical user interfaces for software applications being created, but is also employed for adding many types of functions to applications such as communication, database access, multimedia, etc. With the advent of the World-Wide Web, another natural extension is for use with the Java language and the creation of home pages for businesses. ("Java" is a trademark of Sun Microsystems, Inc.)

Java layout managers have been created to facilitate the visual layout of parts for the creation of Java applications. Several common types exist: 1) a flow type; 2) a border type; 3) a grid type; and 4) a grid bag type.

The flow type layout manager adds components in a top-to-bottom, left-to-right pattern. Parts/components are added until the current row is full, then a new row is started directly therebelow.

The border type layout manager adds components in one of five positions: north, south, east, west or center. The borders (north, south, east and west) are laid out first, and the remaining available space is occupied by the center.

The grid type layout manager adds components to a cell as specified by a row and column. The number of rows and columns must first be specified. Then, components are added similarly to the flow type method.

The grid bag type layout manager is similar to the grid type except that a component may fit into more than one cell. The grid bag can be thought of as a piece of graph paper on which each component is positioned to occupy one or more of the little boxes on the paper.

An advantage to the use of layout managers is that they create displays that are platform independent and can compensate for differences in fonts, display resolutions, and other platform differences. However, none of the known tools provide a visual technique for adding components to layout managers. As a result, use of layout managers is restricted to the manual, difficult process of not only writing code, but writing code that involves using layout constraints, which is a tedious, difficult task. In short, Java layout managers are accessible only to programmers, not to the general public. Thus, there is a need for a method and system for drop guides for a visual layout in Java layout managers.

SUMMARY OF THE INVENTION

The present invention disclosed herein comprises a method and system for drop guides which substantially eliminate problems associated with layout managers. The present invention allows the insertion of drop guides onto layout managers for placement of parts therein.

In accordance with one aspect of the present invention, a method and system of visually assisting the layout of a Java part in a layout manager is provided. At least one drop guide receives a part or component therein. The drop guide is emphasized in any appropriate manner to indicate that the drop guide is empty for receipt of a part. Additional drop guides are added to the layout manager in order to surround the part. Such additional guides may be positioned before, after, above and below the part. The emphasis on the drop guide may include highlighting and/or color.

It is an advantage of the present invention that a user is provided with a simple to use visual programming tool for use with a layout manager.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
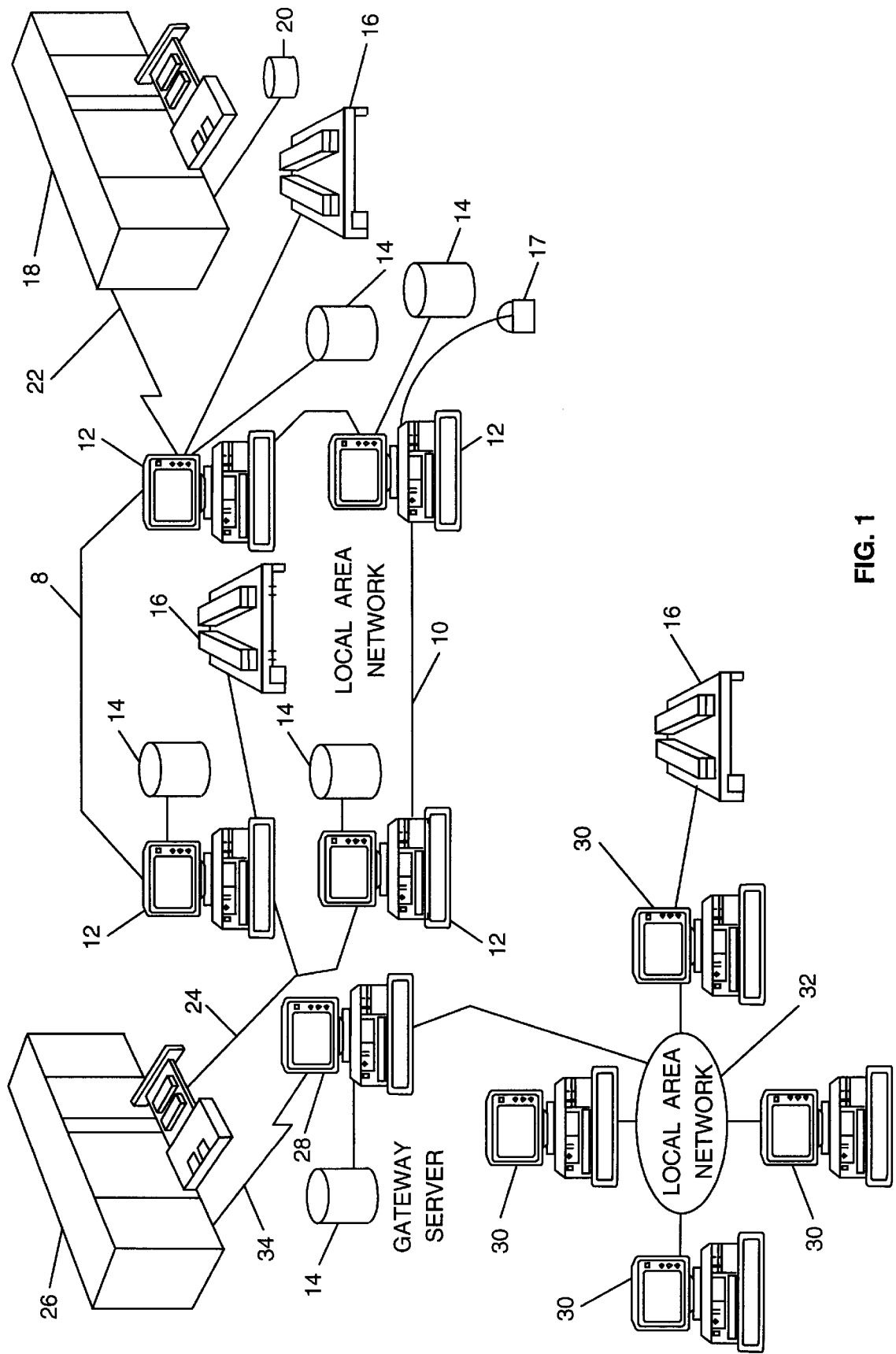
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and, similarly, LAN 10 may be located a substantial distance from LAN 32. For example, LAN 32 may be located in California, while LAN 10 may be located within North Carolina, and mainframe computer 18 may be located in New York.

Software program code which employs the present invention is typically stored in the memory of a storage device 14 of a stand alone workstation or LAN server from which a developer may access the code for distribution purposes. The software program code may be embodied on any of a variety of known media, for use with a data processing system such as a diskette or CD-ROM, or may be distributed to users from a memory of one computer system over a network of some type to other computer systems for use by users of such other systems. Such techniques and methods for embodying software code on media and/or distributing software code are well-known and will not be further discussed herein.

In the preferred embodiment, the present invention is implemented in the Java object oriented language. Application development tools for object oriented development languages, such as Java, Smalltalk, and C++, typically include class libraries or parts or components for use by developers when programming with the development tool. Class libraries are reusable sets of code which usually provide a relatively high level of function which a developer may add to a software application being created. Class libraries are hierarchical in nature, in that a parent or superclass includes characteristics which are inherited by subclasses of the parent class. The subclasses may have further subclasses.

The developer utilizes the code already written for the desired function within the class library by selecting one of the classes for inclusion in the application under development. A copy or "instance" of the class is included in the application being created. The instance includes not only the selected class but all necessary classes from the class' parent classes within the hierarchy to make the instance functional during execution of the application.

Figure 2:
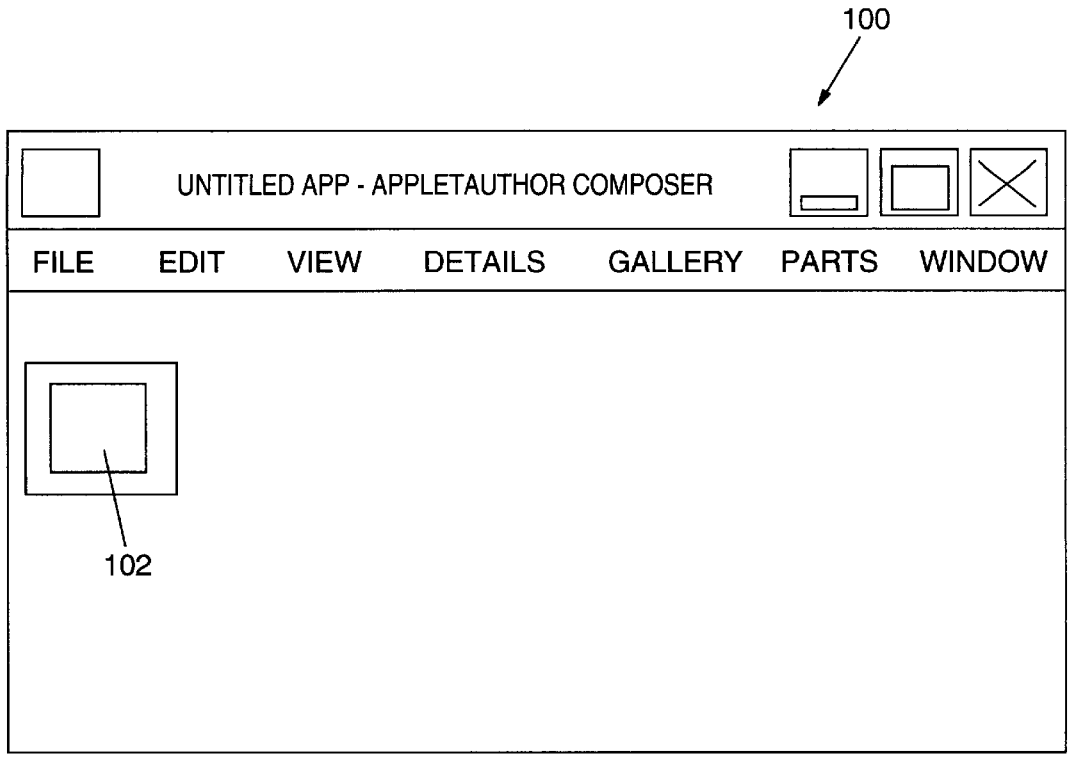
FIGS. 2–10 illustrate the present invention in use with a flow type layout manager.

Referring to FIGS. 2–10, the present invention will be described in use with a flow type layout manager. Referring first to FIG. 2, a flow type layout manager window 100 is illustrated. Unlike conventionally known layout managers, the window 100 has depicted therein a drop guide 102, in accordance with the present invention. The drop guide is positioned in the upper left hand corner which would be the first position for placement of a component.

Figure 3:
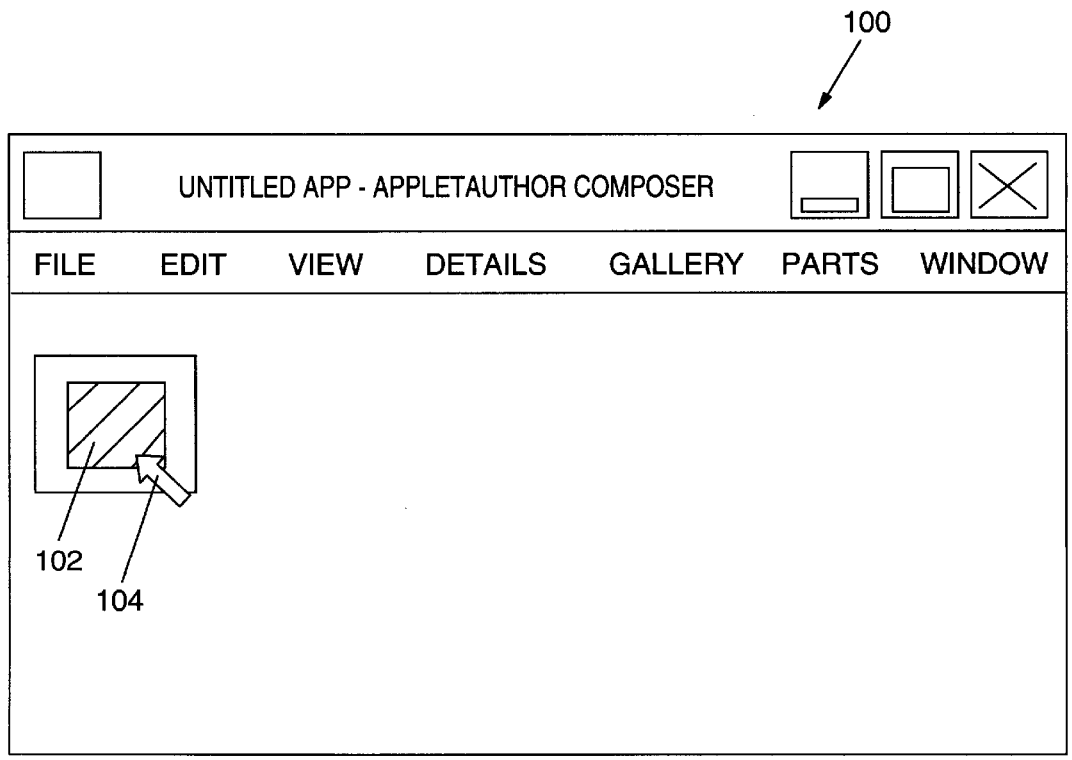
Figure 4:
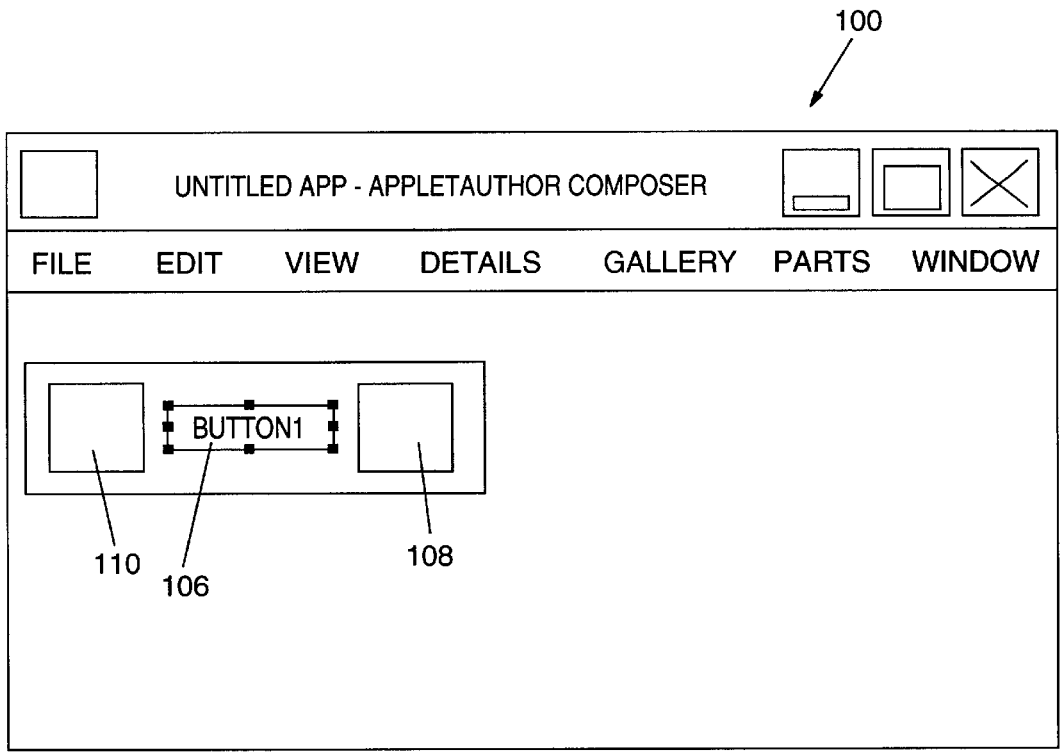
Figure 5:
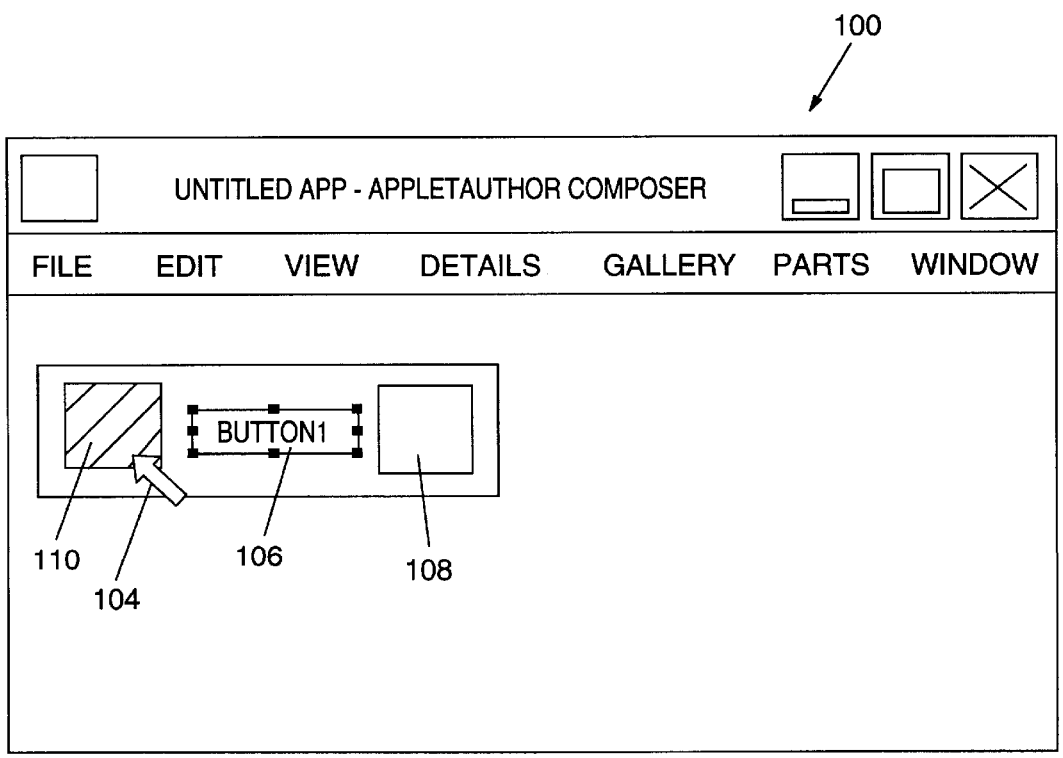

Referring to FIG. 3, a cursor 104 has been placed over the drop guide 102. This causes the drop guide 102 to become highlighted or emphasized in some manner to indicate that it is empty and available for placement of a component therein. In FIG. 4, a part 106, such as a push-button, has been dropped onto the drop guide 102. Upon doing so, the present invention automatically adds a drop guide 108 and a drop guide 110 so that the part 106 is surrounded thereby. FIG. 5 again shows that upon placement of the cursor 104 over a drop guide, such as drop guide 110, an indication that the drop guide is empty is received.

Figure 6:
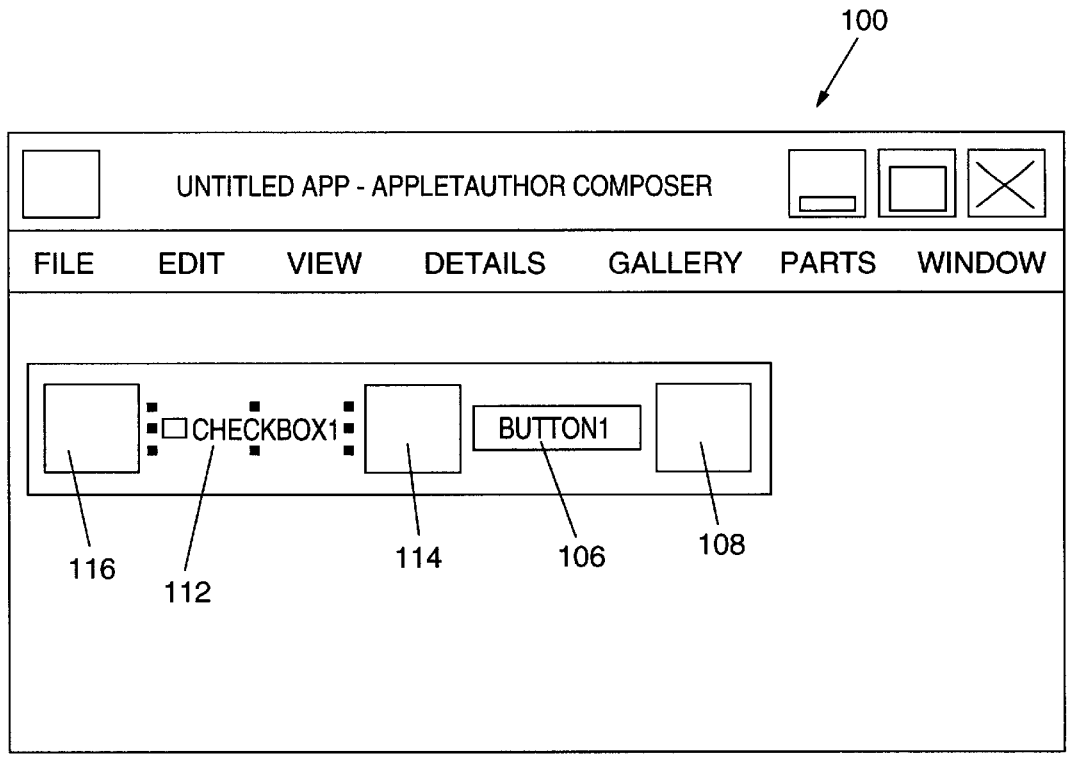

Referring next to FIG. 6, another part 112, for example a checkbox, has been dropped onto the drop guide 110. Upon doing so, the present invention automatically adds drop guides 114 and 116 so that both part 106 and part 112 are surrounded by drop guides. Thus, the present invention always provides drop guides for the placement of a component before or after any component or between any two components.

Figure 7:
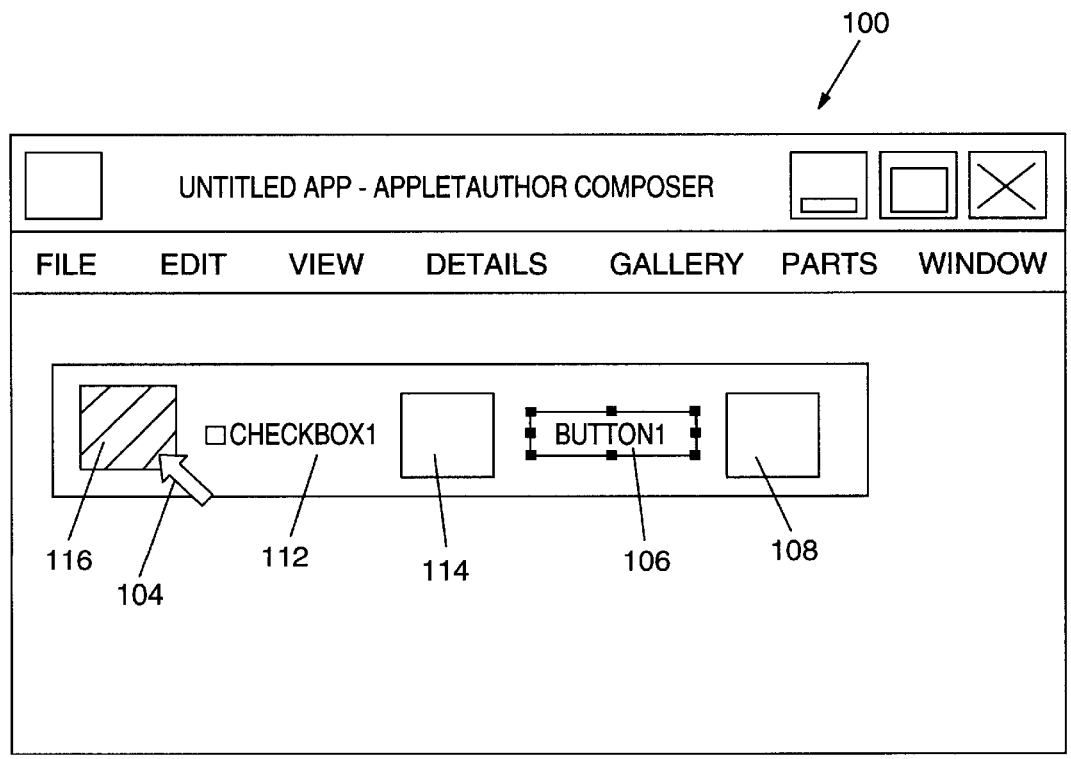
Figure 8:
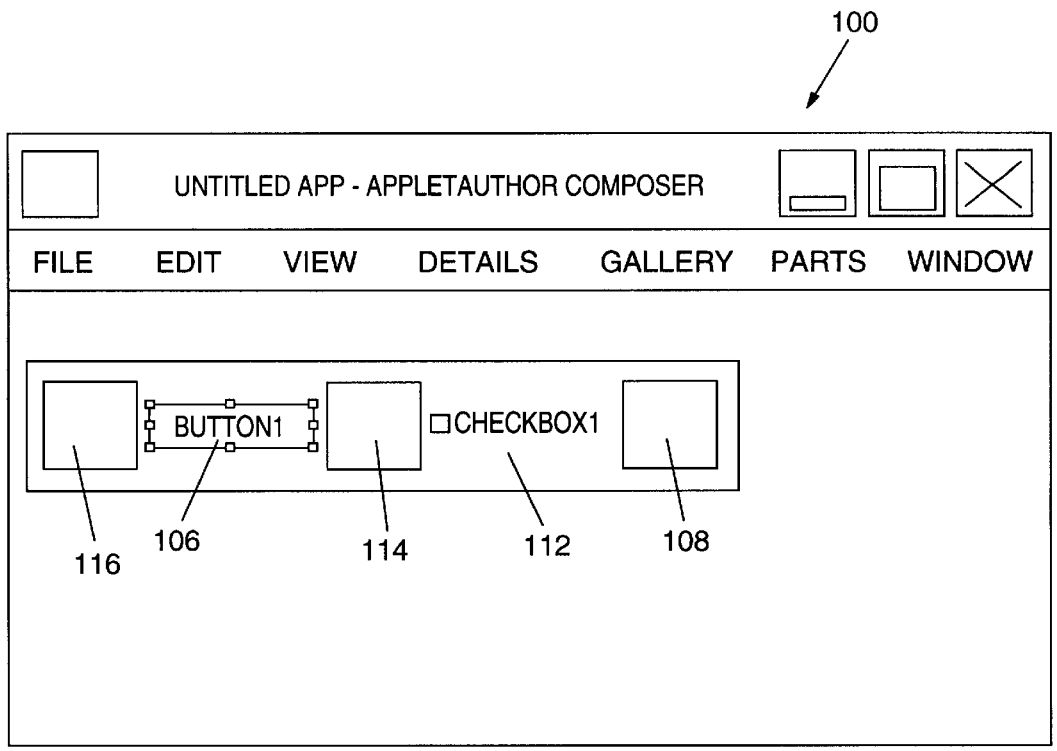

FIGS. 7 and 8 illustrate the use of the present invention to visually move parts. By placing the cursor 104 over the part 106 and selecting it, the part 106 is highlighted. The cursor 104 is then moved to the drop guide 116, and it is selected. This then causes the parts to be repositioned as shown in FIG. 8.

Figure 9:
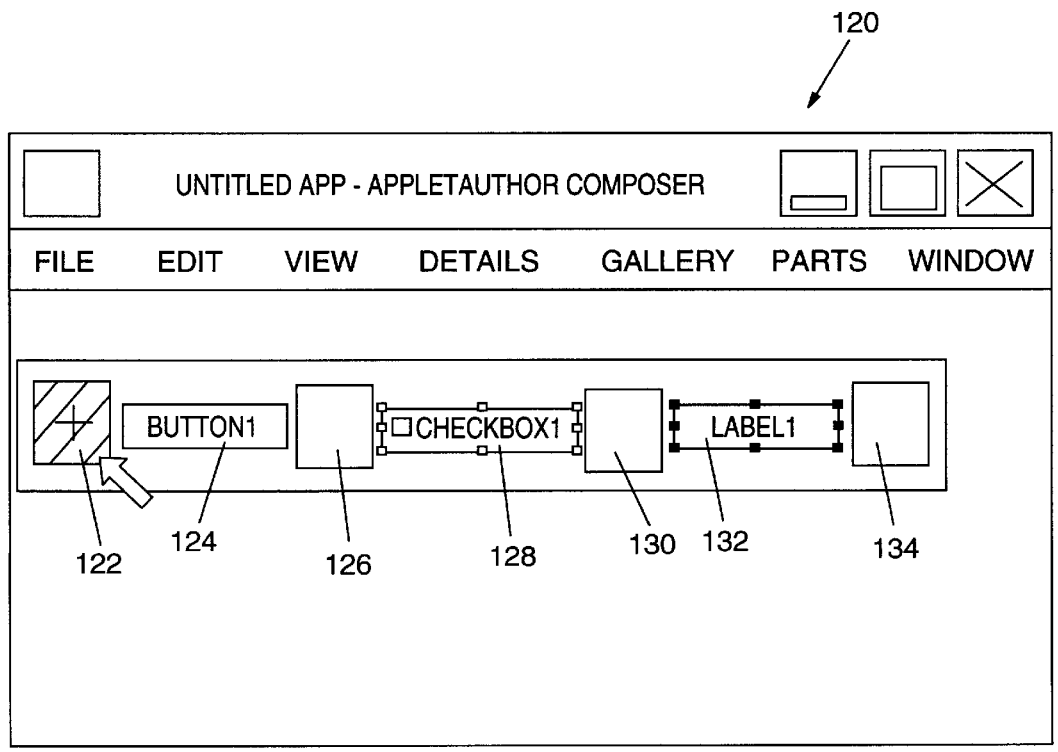
Figure 10:
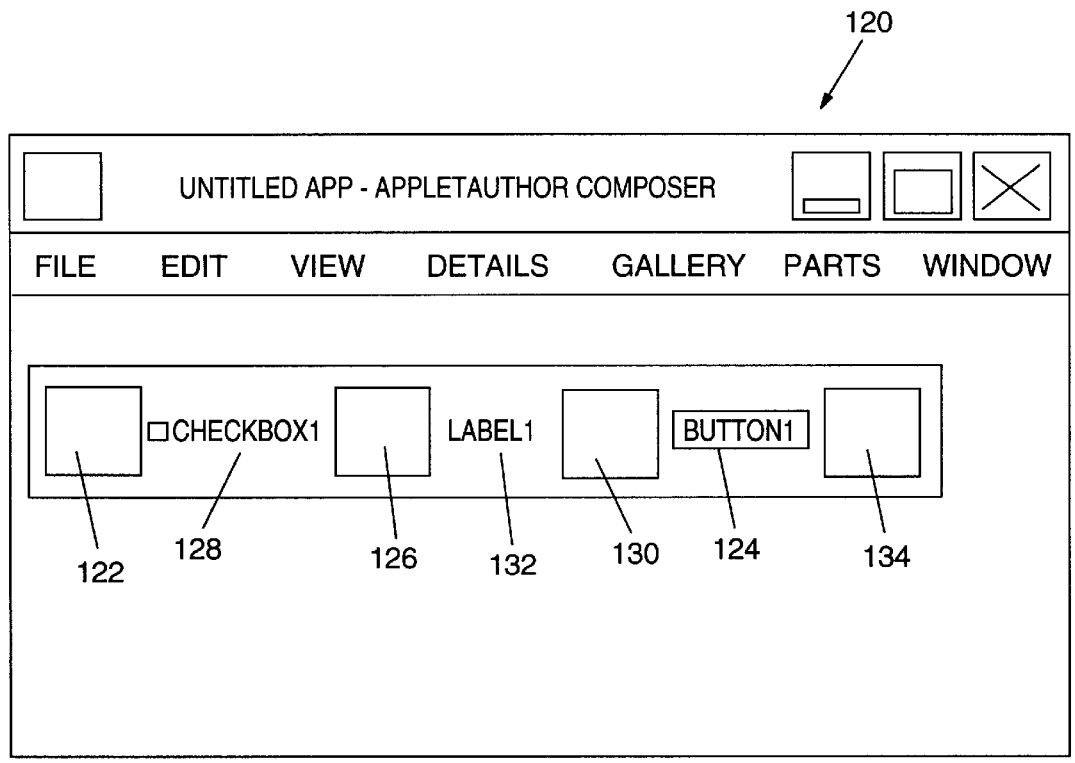

Referring to FIGS. 9 and 10, the use of the present invention to move several parts is illustrated. The flow type arrangement shows in a window 120, a drop guide 122, a push-button 124, a drop guide 126, a checkbox 128, a drop guide 130, a label 132 and a drop guide 134. Upon selection of two parts (the checkbox 128 and the label 132) and the drop guide 122 (for movement hereto), a visual indication is given (the+sign in the drop guide 122). Upon executing the movement command, the parts are rearranged as shown in FIG. 10.

Figure 11:
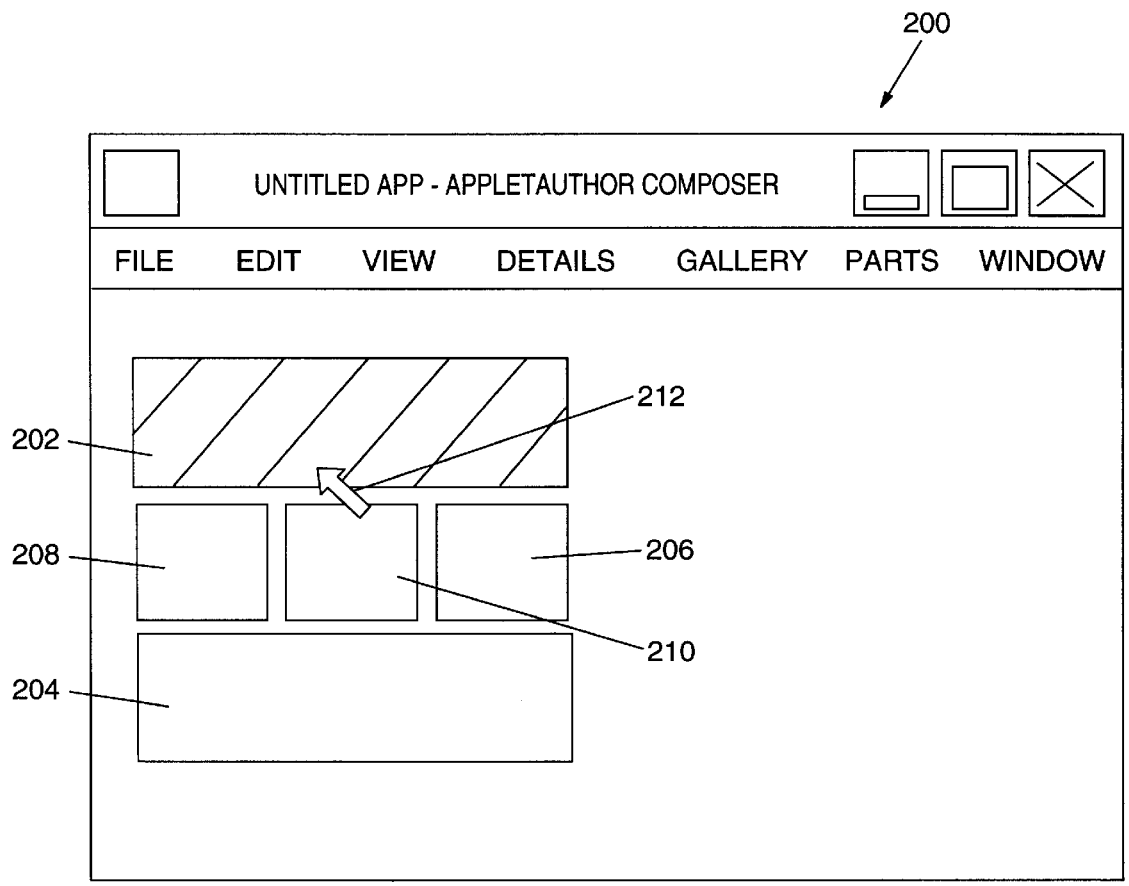
FIG. 11 illustrates the present invention in use with a border type layout manager.

Referring to FIG. 11, the present invention is shown in use with a border type layout manager in a window 200. As is known in the art, the border type manager has five positions for the placement of parts. The five positions are: north 202, south 204, east 206, west 208 and center 210. Whenever a cursor 212 is passed over any of the five positions, a visual indication, such as highlighting or color, is used to show which of the positions are empty and can accept parts therein. The same techniques are used as described above for the movement of parts around the layout manager.

Figure 13:
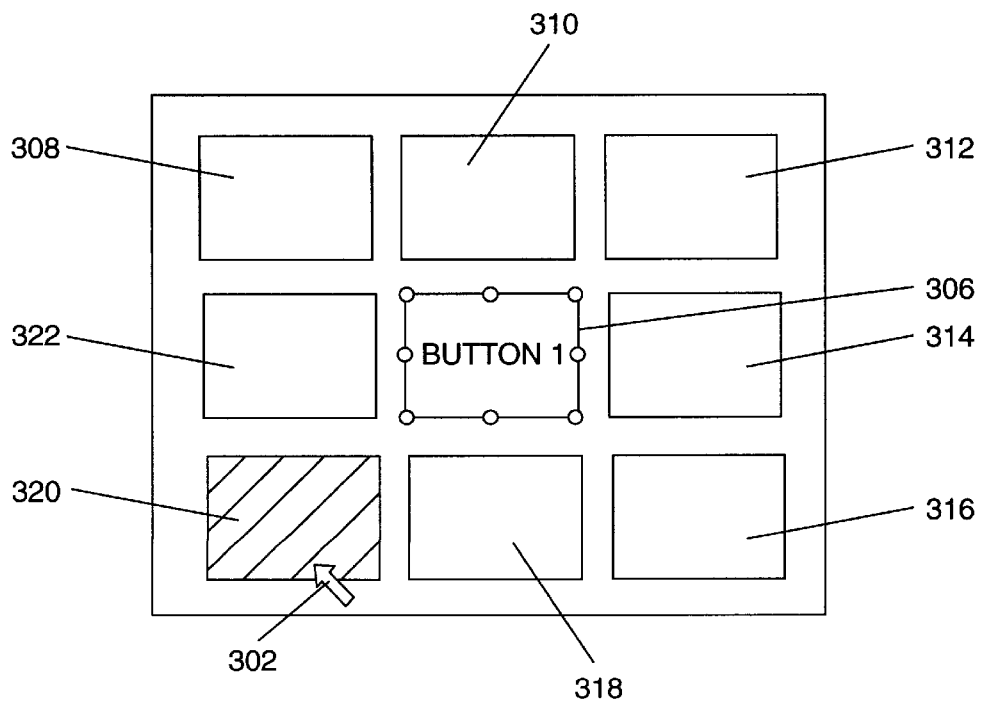
FIGS. 12 and 13 illustrate the use of the present invention with a grid or grid bag type layout manager.
Figure 12:
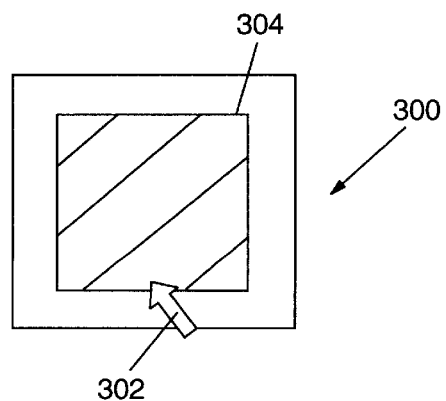

Referring to FIGS. 12 and 13, use of the present invention is illustrated with a grid and/or grid bag type of layout manager in a window 300. As with the previously described embodiments, when a cursor 302 is placed within a drop guide 304, a visual indication is received that the drop guide is available to receive a part. After dropping a part 306 (see FIG. 13) into the drop guide 304, the grid layout manager is updated with new drop guides 308, 310, 312, 314, 316, 318, 320 and 322 in a one-cell wide border surrounding the part 306. In addition, when one of the new drop guides (for example, drop guide 320) has the cursor 302 placed therein, the guide is visually emphasized.

As with the previously described embodiment above, the present invention in use with grid type managers allows the movement of multiple parts and the rearranging of parts with a simple and easy-to-understand visual procedure. Although not shown, it is to be understood that the use of the present invention with grid and grid bag type layout managers will always provide a one-cell wide border around every part. Thus, the grid can be effectively enlarged in any direction.

Although the present invention has been described with respect to a specific preferred embodiment thereof, various changes and modifications may be suggested to one skilled in the art, and it is intended that the present invention encompass such changes and modifications as fall within the scope of the appended claims.

We claim:

1. A method of visually assisting a visual programmer in the layout of a Java part in a layout manager, comprising the steps of:

providing at least one drop guide in a position on said layout manager, wherein said drop guide is a graphical representation serving to visually indicate to said programmer that said position is available for receiving a part therein;

responsive to an action of said programmer, emphasizing the drop guide in any appropriate manner to indicate that said drop guide is empty for receipt of said part;

receiving said part; and responsive to said receiving, adding additional drop guides in order to surround said part therewith.

2. The method of claim 1, wherein said step of adding additional drop guides comprises:

adding a first drop guide positioned prior to said part; and adding a second drop guide positioned after said part.

3. The method of claim 1, wherein said step of adding additional drop guides comprises:

adding a first drop guide positioned prior to said part;

adding a second drop guide positioned after said part;

adding at least a third drop guide positioned above said part; and adding at least a fourth drop guide positioned below said part.

4. The method of claim 1, wherein said step of emphasizing said drop guide comprises:

highlighting said drop guide.

5. The method of claim 1, wherein said step of emphasizing said drop guide comprises:

surrounding said drop guide with a distinctive color.

6. A system for visually assisting a visual programmer in the layout of a Java part in a layout manager, comprising:

means for providing at least one drop guide in a position on said layout manager, wherein said drop guide is a graphical representation serving to visually indicate to said programmer that said position is available for receiving a part therein;

means, responsive to an action of said programmer, for emphasizing the drop guide in any appropriate manner to indicate that said drop guide is empty for receipt of said part;

means for receiving said part; and means, responsive to said means for receiving, for adding additional drop guides in order to surround said part therewith.

7. The system of claim 6, wherein said means for adding additional drop guides comprises:

means for adding a first drop guide positioned prior to said part; and means for adding a second drop guide positioned after said part.

8. The system of claim 6, wherein said means for adding additional drop guides comprises:

means for adding a first drop guide positioned prior to said part;

means for adding a second drop guide positioned after said part;

means for adding at least a third drop guide positioned above said part; and means for adding at least a fourth drop guide positioned below said part.

9. The system of claim 6, wherein said means for emphasizing said drop guide comprises:

means for highlighting said drop guide.

10. The system of claim 6, wherein said means for emphasizing said drop guide comprises:

means for surrounding said drop guide with a distinctive color.

11. A computer program product recorded on computer readable medium for visually assisting a visual programmer in the layout of a Java part in a layout manager, comprising:

computer readable means for providing at least one drop guide in a position on said layout manager, wherein said drop guide is a graphical representation serving to visually indicate to said programmer that said position is available for receiving a part therein;

computer readable means, responsive to an action of said programmer, for emphasizing the drop guide in any appropriate manner to indicate that said drop guide is empty for receipt of said part;

computer readable means for receiving said part; and computer readable means, responsive to said computer readable means for receiving, for adding additional drop guides in order to surround said part therewith.

12. The program product of claim 11, wherein said computer readable means for adding additional drop guides comprises:

computer readable means for adding a first drop guide positioned prior to said part; and computer readable means for adding a second drop guide positioned after said part.

13. The program product of claim 11, wherein said computer readable means for adding additional drop guides comprises:

computer readable means for adding a first drop guide positioned prior to said part;

computer readable means for adding a second drop guide positioned after said part;

computer readable means for adding at least a third drop guide positioned above said part; and computer readable means for adding at least a fourth drop guide positioned below said part.

14. The program product of claim 11, wherein said computer readable means for emphasizing said drop guide comprises:

computer readable means for highlighting said drop guide.

15. The program product of claim 11, wherein said computer readable means for emphasizing said drop guide comprises:

computer readable means for surrounding said drop guide with a distinctive color.

* * * * *